(12) United States Patent
Nakauchi et al.

(10) Patent No.: US 10,618,566 B2
(45) Date of Patent: Apr. 14, 2020

(54) AUTOMOBILE FRONT BODY STRUCTURE

(71) Applicant: MAZDA MOTOR CORPORATION, Hiroshima (JP)

(72) Inventors: Shigeru Nakauchi, Hiroshima (JP); Nobuyuki Nakayama, Aki-gun (JP); Takayuki Nakamae, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 15/760,233

(22) PCT Filed: Oct. 11, 2016

(86) PCT No.: PCT/JP2016/080090
§ 371 (c)(1),
(2) Date: Mar. 15, 2018

(87) PCT Pub. No.: WO2017/069015
PCT Pub. Date: Apr. 27, 2017

(65) Prior Publication Data
US 2018/0244317 A1 Aug. 30, 2018

(30) Foreign Application Priority Data
Oct. 21, 2015 (JP) ................. 2015-206880

(51) Int. Cl.
*B62D 25/08* (2006.01)
*B62D 37/00* (2006.01)

(52) U.S. Cl.
CPC ........... *B62D 25/081* (2013.01); *B62D 25/08* (2013.01); *B62D 37/00* (2013.01)

(58) Field of Classification Search
CPC ......... B62D 37/00; B62D 25/81; B62D 25/08
(Continued)

(56) References Cited

U.S. PATENT DOCUMENTS

2005/0179285 A1  8/2005  Nakajima et al.
2007/0102222 A1  5/2007  Tanaka
(Continued)

FOREIGN PATENT DOCUMENTS

CN      1654258 A   8/2005
CN    102343946 A   2/2012
(Continued)

OTHER PUBLICATIONS

International Search Report issued in PCT/JP2016/080090; dated Dec. 27, 2016.
(Continued)

*Primary Examiner* — Joseph D. Pape
*Assistant Examiner* — Dana D Ivey
(74) *Attorney, Agent, or Firm* — Studebaker & Brackett PC (57) ABSTRACT

Provided is an automobile front body structure configured such that a reinforcement member is joined to a cowl panel. The cowl panel includes an upper surface portion, a forwardly bulging portion, a rearwardly bulging portion, and a lower surface portion. The reinforcement member includes a reinforcement member body which has a substantially squared U-shaped section which is bent and extends along the cowl panel, a first joint portion and a second joint portion. The reinforcement member body includes a wide portion of a substantially squared U-shaped section which is wide in the vehicle width direction and extending along the forwardly bulging portion, and a narrow portion such that a substantially squared U-shaped section is narrowed in the vehicle width direction toward the vehicle lower side. A sectional depth of the narrow portion is larger than a sectional depth of the wide portion.

5 Claims, 9 Drawing Sheets

(58) Field of Classification Search
USPC .......................................................... 296/192
See application file for complete search history.

(56) References Cited

U.S. PATENT DOCUMENTS

| | | |
|---|---|---|
| 2012/0032468 A1 | 2/2012 | Shibutake et al. |
| 2013/0033071 A1 | 2/2013 | Kurata et al. |
| 2013/0134736 A1 | 5/2013 | Kuwabara et al. |
| 2014/0175835 A1* | 6/2014 | Miyamoto ............. B60R 21/34 296/192 |
| 2014/0367994 A1* | 12/2014 | Sasaki ................... B62D 25/08 296/187.09 |

FOREIGN PATENT DOCUMENTS

| | | |
|---|---|---|
| CN | 103129395 A | 6/2013 |
| JP | 2004-217144 A | 8/2004 |
| JP | 2007-153314 A | 6/2007 |
| JP | 2009-012604 A | 1/2009 |
| JP | 2014-121945 A | 7/2014 |
| WO | 2012073682 A1 | 6/2012 |

OTHER PUBLICATIONS

An Office Action mailed by the State Intellectual Property Office of the People's Republic of China dated Nov. 18, 2019, which corresponds to Chinese Patent Application No. 201680052965.2 and is related to U.S. Appl. No. 15/760,233; with English translation.

* cited by examiner

AUTOMOBILE FRONT BODY STRUCTURE

TECHNICAL FIELD

The present invention relates to an automobile front body structure provided with a cowl panel for supporting a lower portion of a front window glass from below a vehicle.

BACKGROUND ART

In order to improve comfort of passengers, there is a demand for high NVH (Noise, Vibration, Harshness) performance in an automobile. For example, suppressing annoying muffled sound generated by transmission of vibration of a front window glass by a wind pressure of traveling wind to a dashboard panel or the like via a cowl panel for supporting a lower portion of the front window glass is also required to improve NVH performance.

For example, in Patent Literature 1, a strip-shaped reinforcement member for connecting an upper portion and a lower portion of a cowl panel is joined to a back surface of the cowl panel whose substantially vertical section along a vehicle front-rear direction is a substantially S-shaped section, whereby supporting rigidity of a front window glass is improved. Patent Literature 1 having the aforementioned configuration suppresses vibration of a front window glass, and tries to improve NVH performance.

Further, a bent portion projecting toward the vehicle rear side is formed on a lower portion of the reinforcement member. The reinforcement member is bent and deformed at the bent portion when a collision object happens to fall onto a front portion of an automobile, and a collision load is exerted on the front window glass from above the vehicle, for example. Patent Literature 1 having the aforementioned configuration tries to absorb a collision load by easily deforming a cowl panel.

As described above, in Patent Literature 1, reinforcing the cowl panel without impairing deformation of the cowl panel when a collision load is exerted on the front window glass makes it possible to improve NVH performance, and to secure protection performance of passers-by.

In recent years, there is an increasing demand for securing an installation space for auxiliary machines on the vehicle rear side than a cowl panel due to diversification of auxiliary machines to be installed in a passenger compartment. However, in Patent Literature 1, a reinforcement member covers a space above the cowl panel of a substantially S-shaped section. Thus, there is a problem that it is difficult to secure an installation space for auxiliary machines on the vehicle rear side on an upper portion of a cowl panel.

On the other hand, in a case where a strip-shaped reinforcement member for connecting an upper portion and a lower portion of a cowl panel is joined to a front surface of the cowl panel of a substantially S-shaped section, it is possible to secure an installation space for auxiliary machines on the vehicle rear side than the cowl panel.

However, in this case, a space below the cowl panel of a substantially S-shaped section covers the reinforcement member. As a result, a space on the vehicle front side than the reinforcement member may be narrowed. Therefore, a space for inserting a welding gun may be narrowed when a panel member is spot-welded to a lower portion of the cowl panel. Thus, there is a problem that welding workability may be lowered.

CITATION LIST

Patent Literature

Patent Literature 1: Japanese Unexamined Patent Publication No. 2014-121945

SUMMARY OF INVENTION

In view of the above, an object of the present invention is to provide an automobile front body structure that enables to secure welding workability without impairing NVH performance of a vehicle, even in a case where a reinforcement member is joined to a front surface of a cowl panel.

The present invention is directed to an automobile front body structure provided with a cowl panel extending in a vehicle width direction of an automobile, and configured to support a lower portion of a front window glass from below a vehicle, and a reinforcement member joined to the cowl panel. The cowl panel includes: an upper surface portion to be joined to the front window glass; a forwardly bulging portion bulging toward a vehicle front side and a vehicle lower side from a front end of the upper surface portion; a rearwardly bulging portion bulging toward a vehicle rear side and the vehicle lower side from the forwardly bulging portion; and a lower surface portion extending toward the vehicle front side from the rearwardly bulging portion. The upper surface portion, the forwardly bulging portion, the rearwardly bulging portion, and the lower surface portion are integrally formed. The reinforcement member includes: a reinforcement member body having a substantially gate-shaped section opened toward the vehicle rear side, bent along a front surface of the cowl panel, and extending toward the vehicle lower side; a first joint portion extending outwardly in the vehicle width direction from an upper portion of the reinforcement member body, and joined to a front surface of the forwardly bulging portion of the cowl panel; and a second joint portion extending outwardly in the vehicle width direction from a lower portion of the reinforcement member body, and joined to a front surface of the rearwardly bulging portion of the cowl panel. The reinforcement member body, the first joint portion, and the second joint portion are integrally formed. The reinforcement member body includes: a wide portion whose sectional shape in a substantially horizontal section is a substantially gate-shaped section which is wide in the vehicle width direction, and extending toward the vehicle lower side along the forwardly bulging portion; and a narrow portion of a shape such that a substantially gate-shaped section extending from the wide portion is narrowed in the vehicle width direction toward the vehicle lower side. A sectional depth of the narrow portion in a vehicle front-rear direction is larger than a sectional depth of the wide portion in the vehicle front-rear direction.

DESCRIPTION OF EMBODIMENTS

In the following, an embodiment of the present invention is described with reference to the drawings.

An automobile 1 in the embodiment is a vehicle compatible with a right hand drive and a left hand drive. A front body of the automobile 1 is described in detail with reference to FIG. 1 to FIG. 9.

Figure 1:
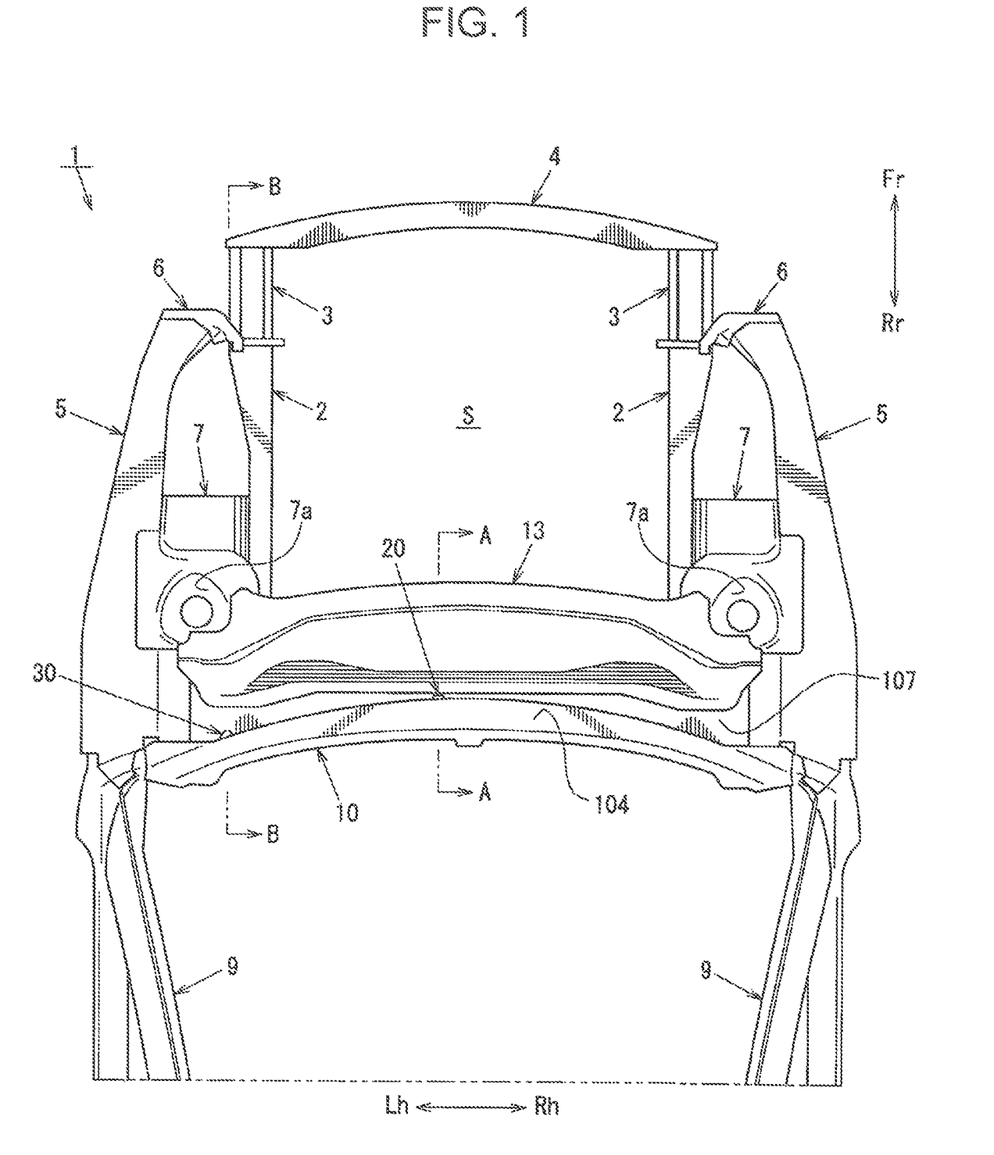
FIG. 1 is a plan view of a front body of an automobile.
Figure 2:
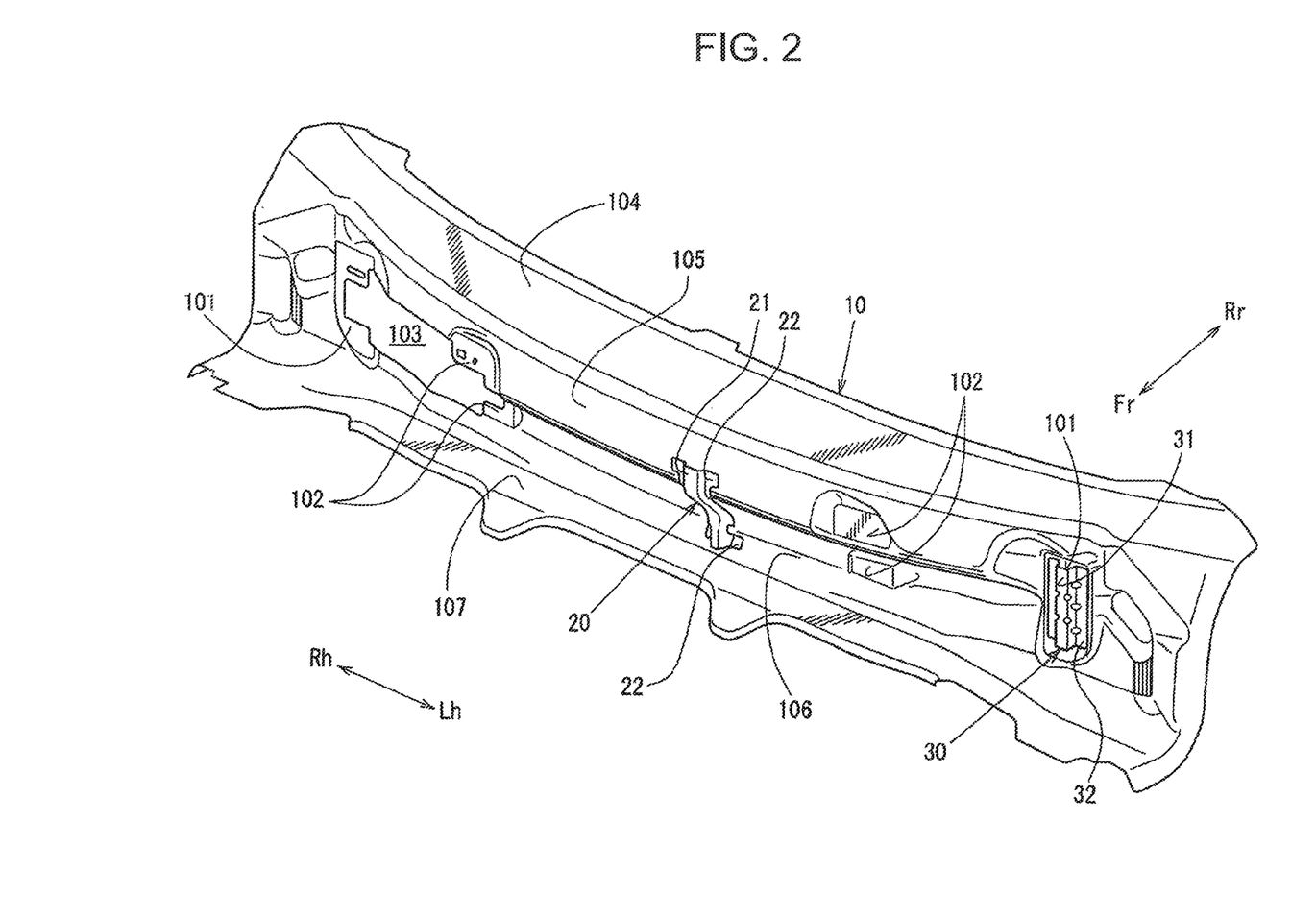
FIG. 2 is a perspective view of a cowl panel when viewed from a vehicle front side and above a vehicle.
Figure 3:
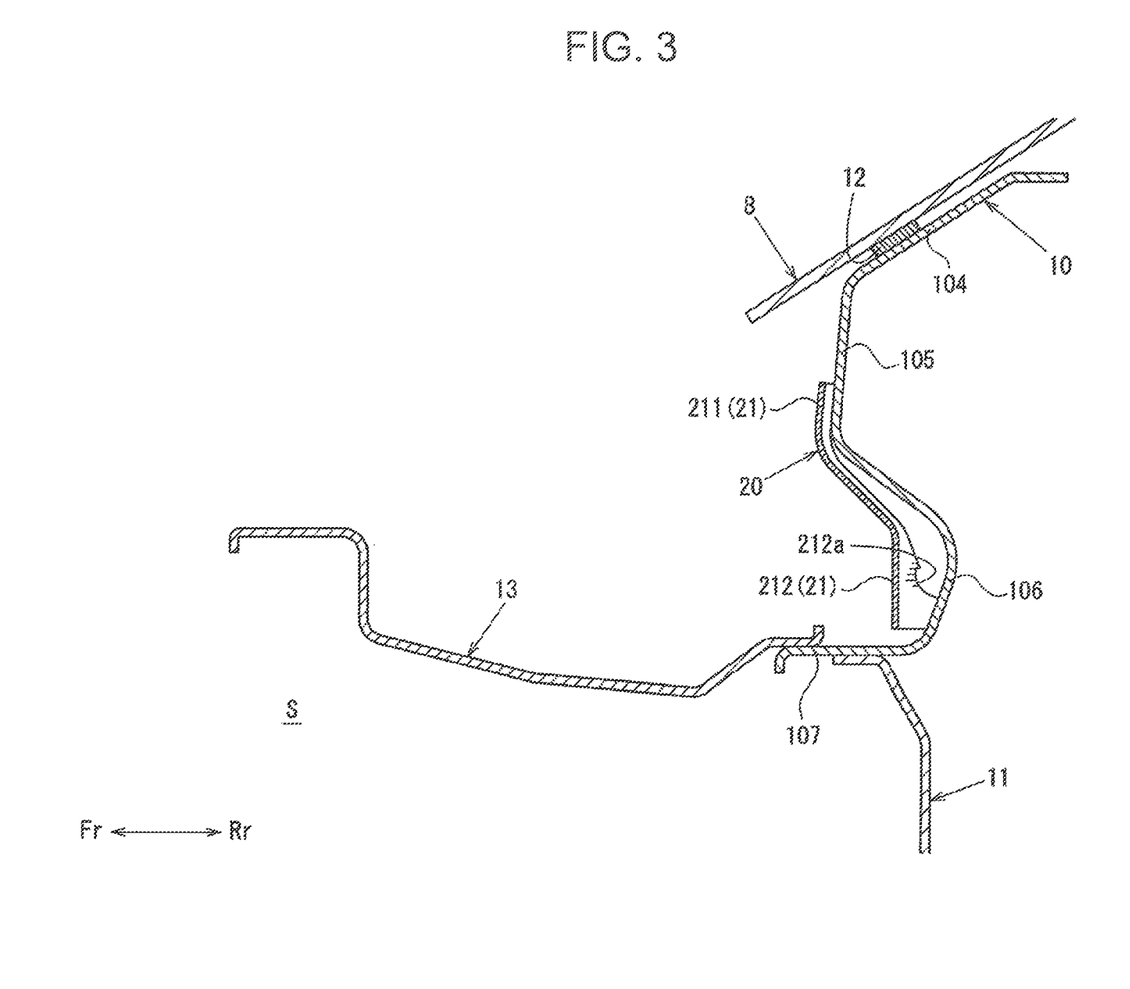
FIG. 3 is a sectional view of essential parts taken along the line A-A in FIG. 1.
Figure 4:
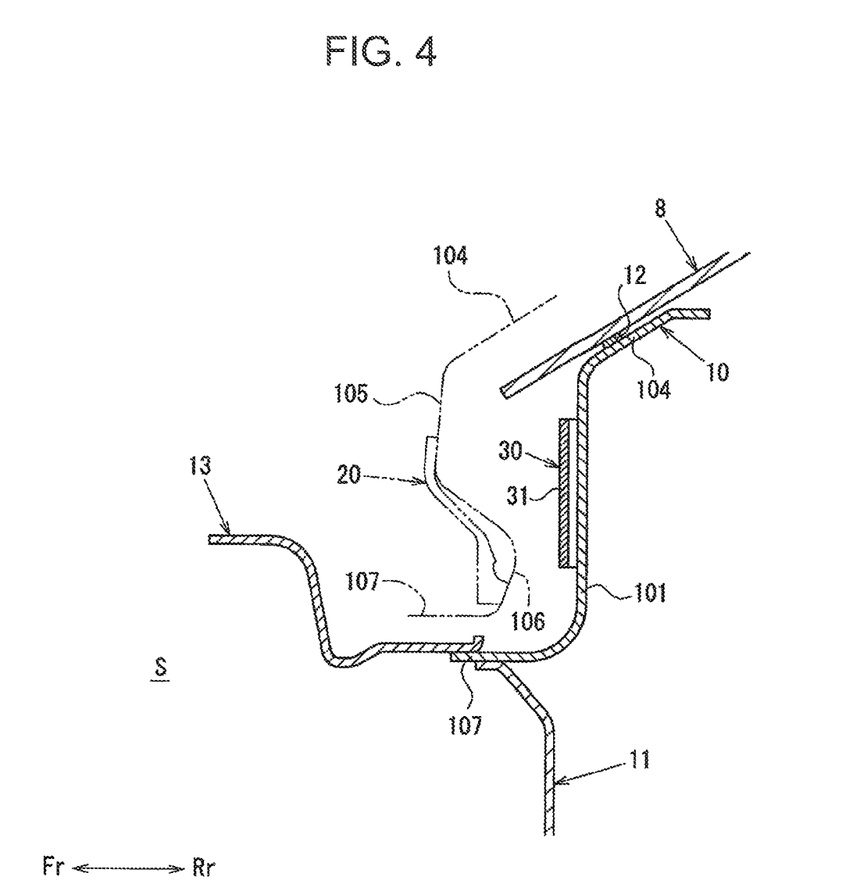
FIG. 4 is a sectional view of essential parts taken along the line B-B in FIG. 1.
Figure 5:
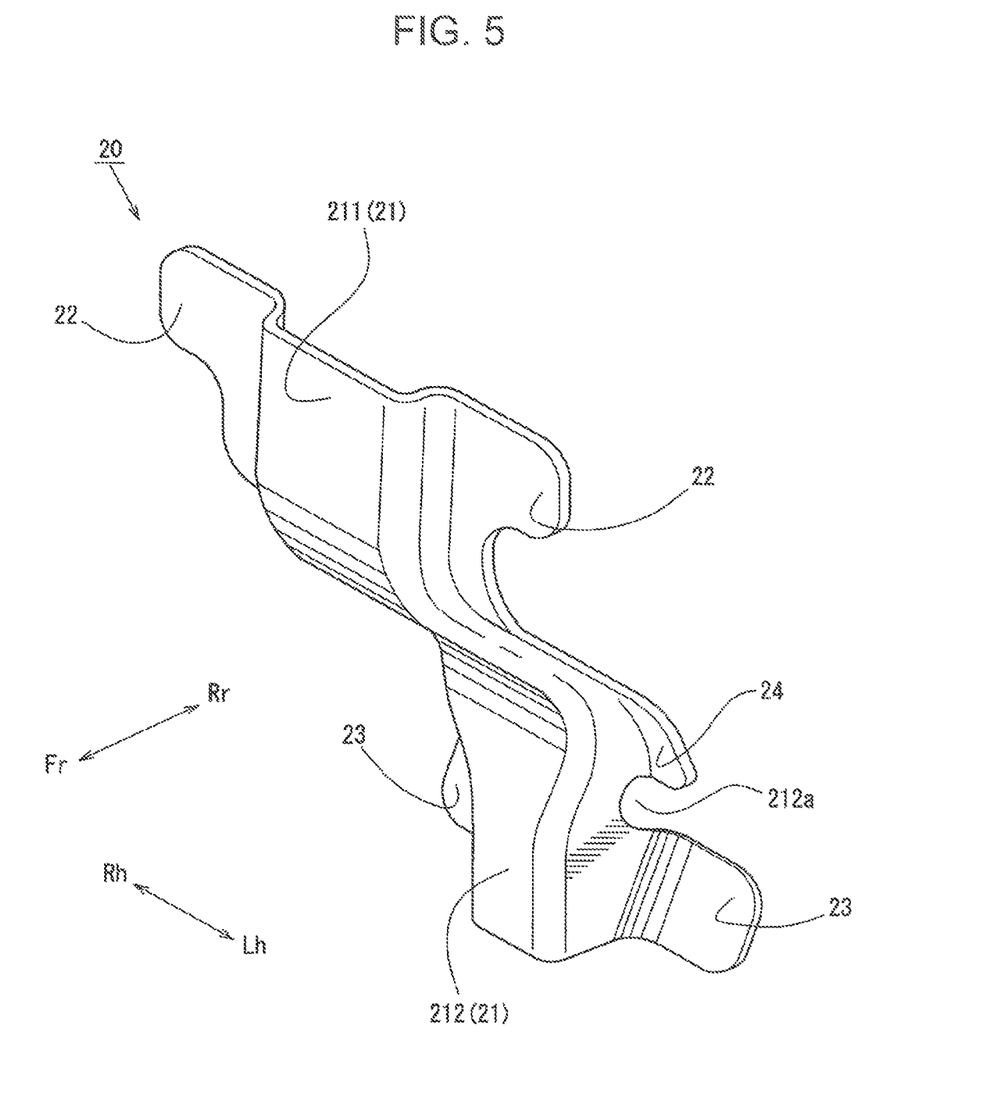
FIG. 5 is a perspective view of a first reinforcement member when viewed from a vehicle front side and above a vehicle.
Figure 6:
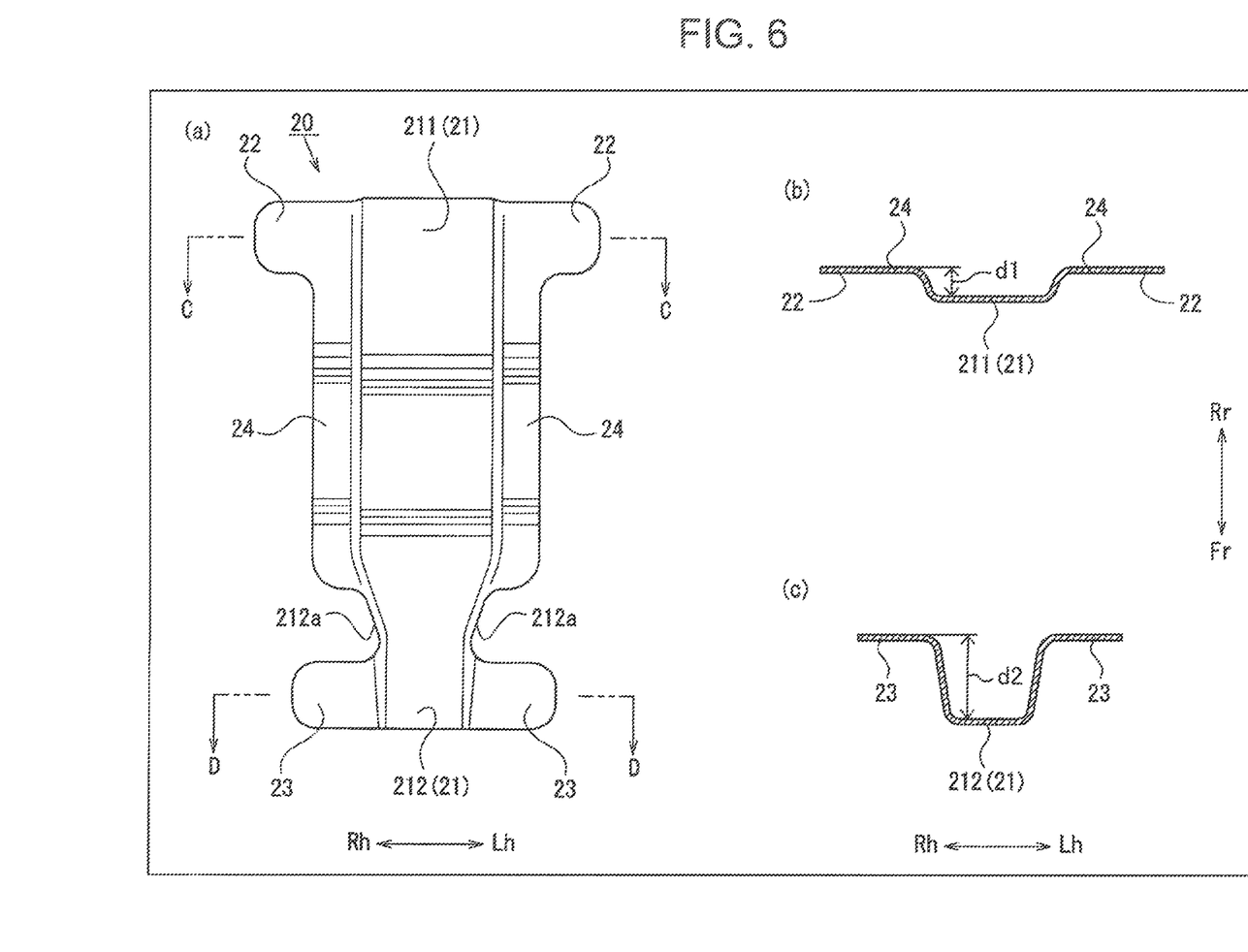
FIG. 6 is an explanatory diagram describing the first reinforcement member.
Figure 7:
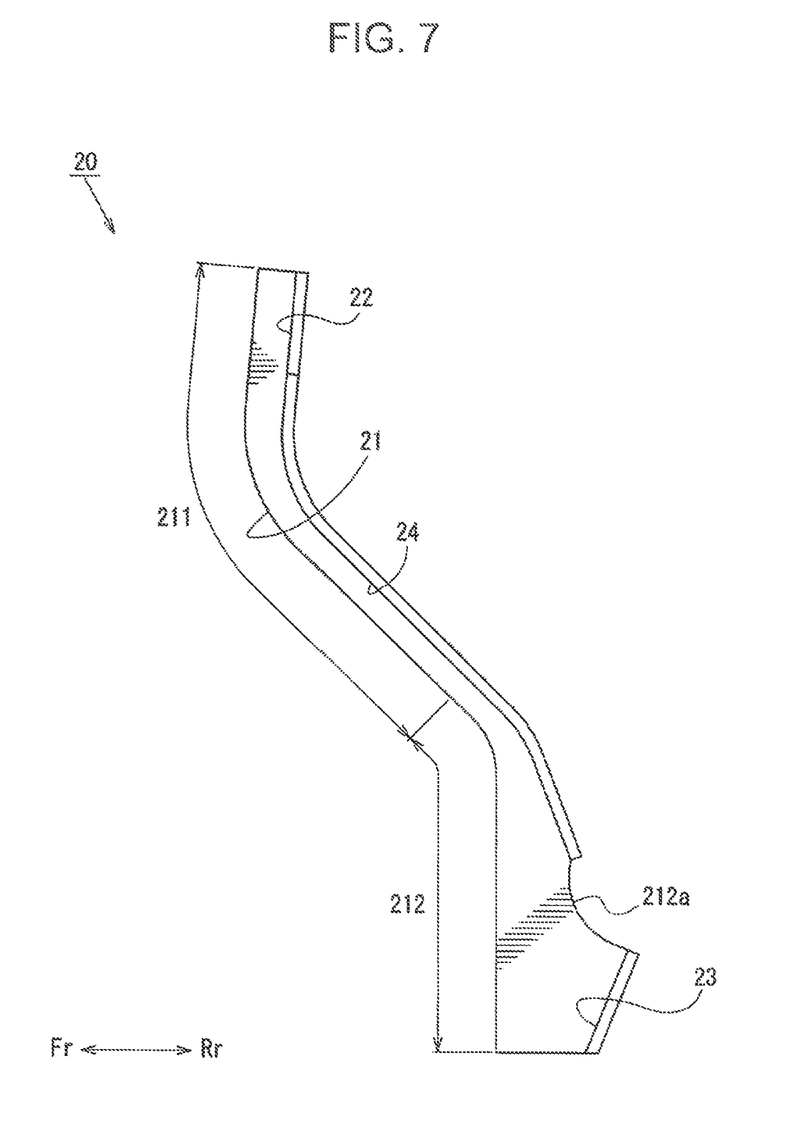
FIG. 7 is a side view of the first reinforcement member.
Figure 8:
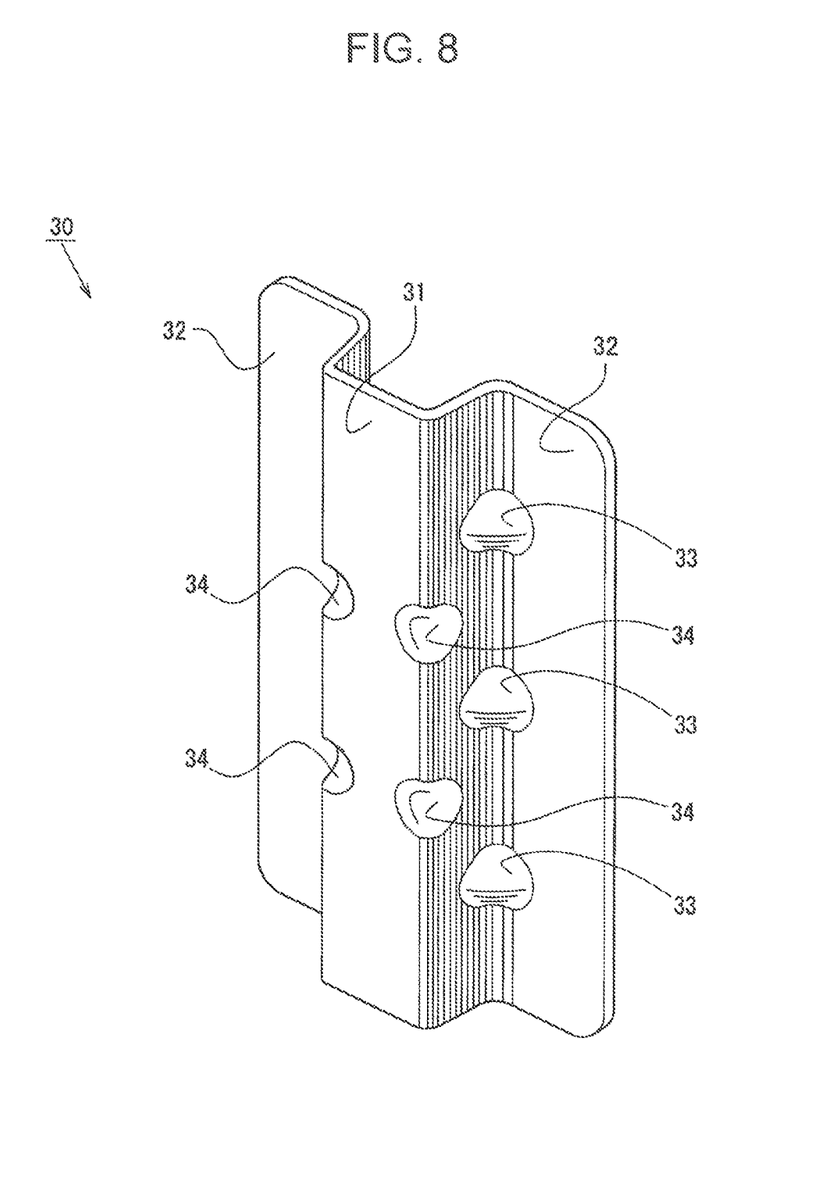
FIG. 8 is a perspective view of a second reinforcement member when viewed from a vehicle front side and above a vehicle.
Figure 9:
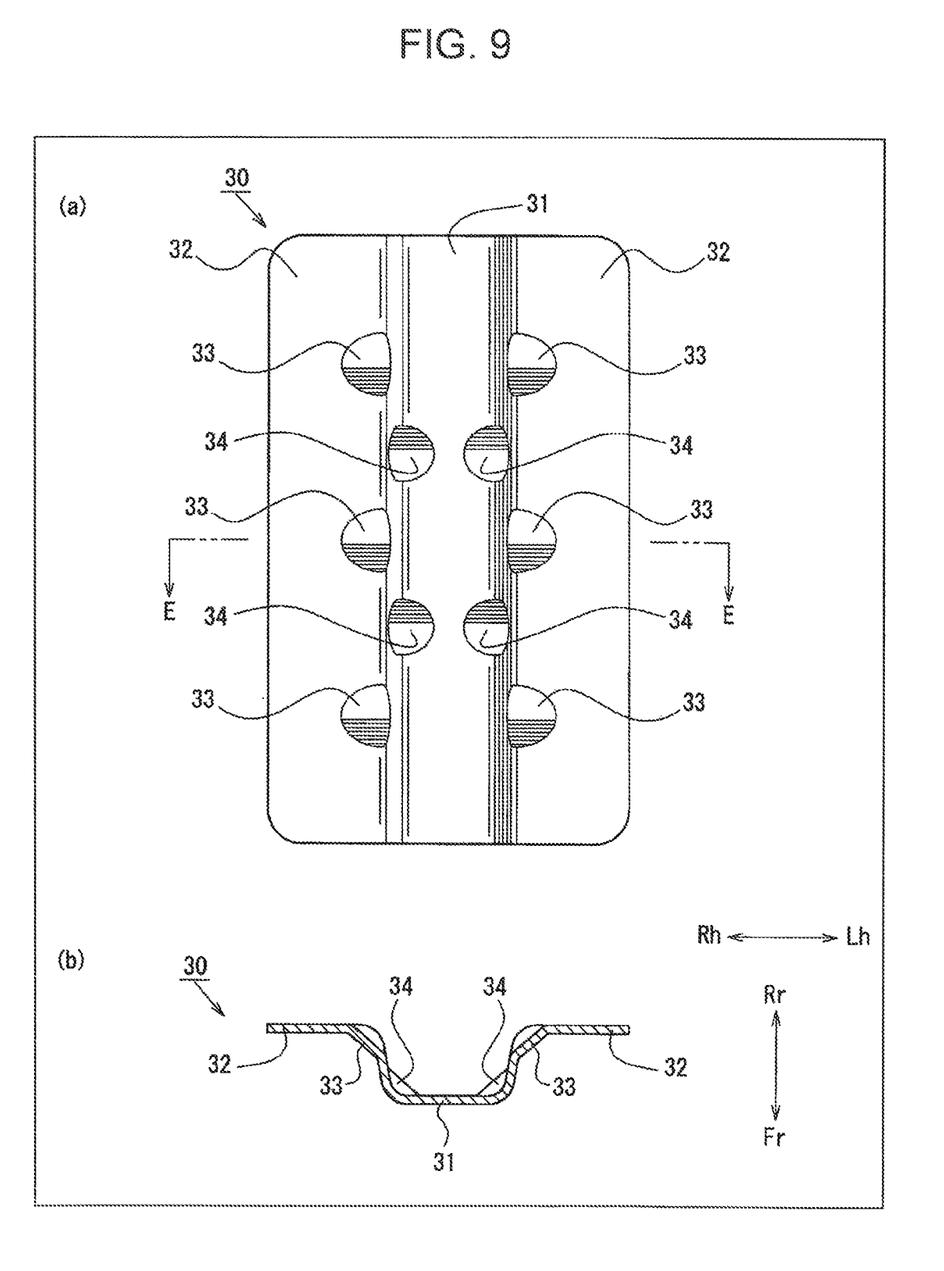
FIG. 9 is an explanatory diagram describing a second reinforcement member.

FIG. 1 is a plan view of the front body of the automobile 1. FIG. 2 is a perspective view of a cowl panel 10 when viewed from a vehicle front side and above a vehicle. FIG. 3 is a sectional view of essential parts taken along the line A-A in FIG. 1. FIG. 4 is a sectional view of essential parts taken along the line B-B in FIG. 1. FIG. 5 is a perspective view of a first reinforcement member 20 when viewed from a vehicle front side and above a vehicle. FIG. 6 is an explanatory diagram describing the first reinforcement member 20. FIG. 7 is a side view of the first reinforcement member 20. FIG. 8 is a perspective view of a second reinforcement member 30 when viewed from a vehicle front side and above a vehicle. FIG. 9 is an explanatory diagram describing the second reinforcement member 30.

Further, the section (a) of FIG. 6 indicates a front view of the first reinforcement member 20. The section (b) of FIG. 6 indicates a sectional view taken along the line C-C in the section (a). The section (c) of FIG. 6 indicates a sectional view taken along the line D-D in the section (a). The section (a) of FIG. 9 indicates a front view of the second reinforcement member 30. The section (b) of FIG. 9 indicates a sectional view taken along the line E-E in the section (a).

Further, in the drawings, arrows Fr and Rr indicate vehicle front-rear directions, and specifically, the arrow Fr indicates a vehicle front side, and the arrow Rr indicates a vehicle rear side. Further, arrows Rh and Lh indicate vehicle width directions, and specifically, the arrow Rh indicates a vehicle right side, and the arrow Lh indicates a vehicle left side. In addition to the above, an upper side in the drawings indicates a vehicle upper side, and a lower side in the drawings indicates a vehicle lower side.

As illustrated in FIG. 1, the front body of the automobile 1 includes, in a plan view, a pair of left and right front side frames 2 extending in the vehicle front-rear direction with a predetermined distance away from each other in the vehicle width direction; a crash can 3 connected to a front end of each of the front side frames 2 and extending in the vehicle front-rear direction; a bumper reinforcement 4 for connecting front ends of the crash cans 3 in the vehicle width direction; and a pair of left and right apron reinforcements 5 extending in the vehicle front-rear direction on the outer side than the front side frames 2 in the vehicle width direction and above the vehicle.

Further, the front body of the automobile 1 includes a side stay 6 for connecting a front end of each of the apron reinforcements 5 and a front end of each of the front side frames 2. In addition to the above, the front body of the automobile 1 includes an apron panel 7 for connecting a rear portion of each of the front side frames 2, and a rear portion of each of the apron reinforcements 5. A suspension tower portion 7a for supporting an upper portion of a suspension (not illustrated) is integrally formed with each of the apron panels 7.

The front body of the automobile 1 includes the cowl panel 10 for connecting front ends of a pair of left and right front pillars 9 for supporting a front window glass 8 (see FIG. 3) in the vehicle width direction, and a dashboard panel 11 (see FIG. 3) connected below the cowl panel 10. An engine room S and a passenger compartment (not illustrated) are isolated from each other by the cowl panel 10 and the dashboard panel 11.

Next, the cowl panel 10 in the embodiment is described in detail with reference to FIG. 2 to FIG. 9.

As illustrated in FIG. 1 and FIG. 2, the cowl panel 10 has a substantially arc shape in a plan view projecting toward the vehicle front side in such a manner as to align with a lower edge of the front window glass 8, and supports a lower portion of the front window glass 8 from below the vehicle.

As illustrated in FIG. 2 and FIG. 3, the cowl panel 10 is formed by three-dimensionally shaping a metal flat plate having a predetermined thickness in such a manner that a sectional shape thereof in a substantially vertical section along the vehicle front-rear direction becomes a substantially S-shaped section.

Further, as illustrated in FIG. 2, an outer-side auxiliary machine mounting portion 101 formed in the vicinity of an end of the cowl panel 10 in the vehicle width direction, and an inner-side auxiliary machine mounting portion 102 formed at a position away from the outer-side auxiliary machine mounting portion 101 on the inner side in the vehicle width direction are formed on a front surface of the cowl panel 10, each on the vehicle right side and on the vehicle left side with respect to a substantially middle of the cowl panel 10 in the vehicle width direction.

The outer-side auxiliary machine mounting portion 101 and the inner-side auxiliary machine mounting portion 102 are formed in such a manner that both ends of a blower (not illustrated) in the vehicle width direction for guiding external air to an air-conditioner within the passenger compartment are mountable. In a case of a right hand drive car, a blower is mounted on an outer-side auxiliary machine mounting portion 101 and an inner-side auxiliary machine mounting portion 102 on the vehicle left side. In a case of a left hand drive car, a blower is mounted on an outer-side auxiliary machine mounting portion 101 and an inner-side auxiliary machine mounting portion 102 on the vehicle right side.

In the cowl panel 10 in the embodiment, a blower opening 103 of a substantially rectangular shape in a front view, and configured to receive a blower is formed between the outer-side auxiliary machine mounting portion 101 and the inner-side auxiliary machine mounting portion 102 on the vehicle right side.

More specifically, as illustrated in FIG. 3, the cowl panel 10 (a substantially S-shaped sectional portion) includes an upper surface portion 104 to be joined to a lower portion of the front window glass 8, a forwardly bulging portion 105 bulging toward the vehicle front side and the vehicle lower side from the upper surface portion 104, a rearwardly bulging portion 106 bulging toward the vehicle rear side and the vehicle lower side from the forwardly bulging portion 105, and a lower surface portion 107 extending toward the vehicle front side from the rearwardly bulging portion 106. The upper surface portion 104, the forwardly bulging portion 105, the rearwardly bulging portion 106, and the lower surface portion 107 are integrally formed from the aforementioned metal flat plate.

As illustrated in FIG. 3, the upper surface portion 104 is formed into such a shape that the upper surface portion 104 slightly extends toward the vehicle front side from a rear end thereof, and extends toward the vehicle front side and the vehicle lower side along an inclination of the front window glass 8. A front end of an inclined portion of the upper surface portion 104 is joined to a lower portion of the front window glass 8 via an adhesive agent 12.

As illustrated in FIG. 3, the forwardly bulging portion 105 is formed on the vehicle front side than a position where the adhesive agent 12 is applied, and is formed into such a shape that a sectional shape in a substantially vertical section along the vehicle front-rear direction becomes a substantially gate-shaped section bulging toward the vehicle front side.

Specifically, the forwardly bulging portion 105 has such a shape that the forwardly bulging portion 105 extends toward the vehicle front side and the vehicle lower side from a front end of the upper surface portion 104, is bent and extends toward the vehicle lower side from a tip end thereof, and is further bent and extends toward the vehicle rear side and the vehicle lower side from a tip end thereof.

As illustrated in FIG. 3, the rearwardly bulging portion 106 is formed in such a manner that a sectional shape in a substantially vertical section along the vehicle front-rear direction becomes a substantially gate-shaped section bulging toward the vehicle rear side. Specifically, the rearwardly bulging portion 106 extends toward the vehicle rear side and the vehicle lower side from a rear end of the forwardly bulging portion 105, is bent and extends toward the vehicle front side and the vehicle lower side from a tip end thereof, and is further bent toward the vehicle front side from a tip end thereof.

The lower surface portion 107 is formed to extend toward the vehicle front side from the rearwardly bulging portion 106 in such a manner that an end of the lower surface portion 107 is located on the vehicle front side than a front surface of the forwardly bulging portion 105. The lower surface portion 107 is formed into such a shape that a substantially middle of the lower surface portion 107 in the vehicle width direction is slightly curved to project toward the vehicle upper side with respect to both ends of the lower surface portion 107 in the vehicle width direction in a front view.

An upper end of the dashboard panel 11 for isolating the engine room S and the passenger compartment is welded and fixed to a lower surface of the lower surface portion 107. Further, a rear end of a cowl front panel 13 for connecting the suspension tower portions 7a of the apron panels 7 in the vehicle width direction is welded and fixed to an upper surface of the lower surface portion 107.

As illustrated in FIG. 2, the outer-side auxiliary machine mounting portion 101 is formed into such a shape that the outer-side auxiliary machine mounting portion 101 has a flat surface of a size capable of mounting an end of a blower in the vehicle width direction, and the forwardly bulging portion 105 of a substantially S-shaped sectional portion is recessed toward the vehicle rear side.

More specifically, as illustrated in FIG. 4, the outer-side auxiliary machine mounting portion 101 is formed such that a front end of the upper surface portion 104 and a lower end of the lower surface portion 107 are connected in the vehicle up-down direction, and is formed into a substantially flat plat shape having a thickness in the vehicle front-rear direction.

As illustrated in FIG. 2, the inner-side auxiliary machine mounting portion 102 is formed into a flat surface capable of mounting the other end of the blower in the vehicle width direction by indenting the forwardly bulging portion 105 of a substantially S-shaped sectional portion toward the vehicle rear side, and by bulging the rearwardly bulging portion 106 toward the vehicle front side.

Further, as illustrated in FIG. 2 to FIG. 4, the first reinforcement member 20 (corresponding to a reinforcement member of the present invention) is welded to a front surface of the cowl panel 10 at a position slightly offset on the vehicle left side from a substantially middle of the cowl panel 10 in the vehicle width direction, and the second reinforcement member 30 is welded to the outer-side auxiliary machine mounting portion 101 on the vehicle left side.

The first reinforcement member 20 is formed into a three-dimensional shape extending in the vehicle up-down direction by bending a metal flat plate whose expanded shape is a substantially I-shape and having a predetermined thickness along a substantially S-shaped sectional portion of the cowl panel 10 in a side view.

More specifically, as illustrated in FIG. 3 and FIG. 5, the first reinforcement member 20 includes a member body 21 (corresponding to a reinforcement member body of the present invention) extending along a substantially S-shaped sectional portion of the cowl panel 10 in a side view, an upper-side welding portion 22 (corresponding to a first joint portion of the present invention) to be welded to the forwardly bulging portion 105, and a lower-side welding portion 23 (corresponding to a second joint portion of the present invention) to be welded to the rearwardly bulging portion 106. The member body 21, the upper-side welding portion 22, and the lower-side welding portion 23 are integrally formed from the aforementioned metal flat plate.

As illustrated in FIG. 3, the section (a) of FIG. 6 and FIG. 7, the member body 21 is constituted by a wide portion 211 which has a large width in the vehicle width direction and which is bent along the forwardly bulging portion 105 of the cowl panel 10 in a side view, and a narrow portion 212 which is narrower than the total width of the wide portion 211 and which is bent and extends along the rearwardly bulging portion 106 of the cowl panel 10 in a side view.

As illustrated in the section (b) of FIG. 6, the wide portion 211 is formed into a substantially squared U-shaped section, whose sectional shape in a substantially horizontal section is opened toward the vehicle rear side, and whose length in the vehicle width direction is longer than a length in the vehicle front-rear direction.

As illustrated in FIG. 3 and FIG. 7, the wide portion 211 is formed into such a shape that the wide portion 211 is bent in an area from a substantially middle of the forwardly bulging portion 105 of the cowl panel 10 in the vehicle up-down direction to a rear end of the forwardly bulging portion 105 in a side view along the forwardly bulging portion 105.

Specifically, the wide portion 211 has such a shape that the wide portion 211 extends toward the vehicle lower side along a front surface of the forwardly bulging portion 105, and is bent and extends toward the vehicle rear side and the vehicle lower side with a curvature smaller than a curvature of a bent portion of the forwardly bulging portion 105 on the vehicle lower side.

As illustrated in FIG. 6, the narrow portion 212 has a substantially squared U-shaped section extending toward the vehicle lower side from the wide portion 211 in a front view, and is formed into such a shape that the narrow portion 212 is narrowed in the vehicle width direction toward the vehicle lower side.

As illustrated in FIG. 3 and FIG. 7, the narrow portion 212 has such a shape that the narrow portion 212 extends toward the vehicle rear side and the vehicle lower side from the wide portion 211, and is bent and extends toward the vehicle lower side with a curvature smaller than a curvature of a bent portion of the rearwardly bulging portion 106 on the vehicle upper side in a side view. A lower end of the narrow portion 212 is located on the vehicle upper side than a lower end of the rearwardly bulging portion 106.

As illustrated in the sections (b) and (c) of FIG. 6, the narrow portion 212 is formed in such a manner that a sectional depth d2 thereof (i.e. a depth in the vehicle front-rear direction) is larger than a sectional depth d1 of the wide portion 211.

As described above, by forming the narrow portion 212 into such a shape that a substantially squared U-shaped section extending from the wide portion 211 is narrowed in the vehicle width direction, the narrow portion 212 is formed into a substantially squared U-shaped section such that a gap between opposing surfaces of the narrow portion 212 and the rearwardly bulging portion 106 is larger than a gap between opposing surfaces of the forwardly bulging portion 105 and the wide portion 211 in the vehicle front-rear direction.

Further, as illustrated in FIG. 5 and FIG. 7, a cutaway portion 212a is formed in a side surface of the narrow portion 212 by cutting a rear end edge of the narrow portion 212 toward the vehicle front side, on the vehicle lower side than a bent portion along the rearwardly bulging portion 106 in a side view.

A flange portion 24 projecting outwardly in the vehicle width direction is formed on a rear end of the member body 21 of the first reinforcement member 20 in an area from the wide portion 211 to the cutaway portion 212a of the narrow portion 212. In other words, the first reinforcement member 20 is formed into a substantially hat-shaped section in an area from the wide portion 211 to the cutaway portion 212a of the narrow portion 212.

As illustrated in FIG. 5 and FIG. 6, the upper-side welding portion 22 is formed into a substantially flat plate shape such that an upper portion of the flange portion 24 extends further outwardly in the vehicle width direction, and is capable of abutting against the forwardly bulging portion 105 of the cowl panel 10.

As illustrated in FIG. 5 and FIG. 6, the lower-side welding portion 23 is formed into a substantially flat plate shape such that the lower-side welding portion 23 projects outwardly in the vehicle width direction from a rear end of the narrow portion 212, and is capable of abutting against the rearwardly bulging portion 106 of the cowl panel 10.

On the other hand, as illustrated in FIG. 8 and FIG. 9, the second reinforcement member 30 is formed by three-dimensionally shaping a metal flat plate whose expanded shape is a substantially rectangular shape and having a predetermined thickness into a substantially hat-shaped section whose sectional shape in a substantially horizontal section projects toward the vehicle front side.

More specifically, as illustrated by the two-dotted chain line in FIG. 4, the second reinforcement member 30 is formed to have a length in the vehicle up-down direction, which is substantially equal to a length in the vehicle up-down direction of an area from a substantially middle of the forwardly bulging portion 105 in the vehicle up-down direction to an upper portion of the rearwardly bulging portion 106.

As illustrated in FIG. 8 and FIG. 9, the second reinforcement member 30 is formed into a substantially hat-shaped section by the member body 31 whose sectional shape in a substantially horizontal section is a substantially squared U-shaped section opened toward the vehicle rear side and which extends in the vehicle up-down direction, and the flange portion 32 which projects outwardly in the vehicle width direction from a rear end of the member 31 and which is welded to the outer-side auxiliary machine mounting portion 101.

In other words, the second reinforcement member 30 has a shape capable of forming a substantially rectangular closed section extending in the vehicle up-down direction in cooperation with the outer-side auxiliary machine mounting portion 101 in a state that the second reinforcement member 30 is welded to the outer-side auxiliary machine mounting portion 101.

Further, as illustrated in FIG. 8 and FIG. 9, three pairs of left and right first projecting portions 33 projecting toward the vehicle front side from a boundary between the member body 31 and the flange portion 32 are formed on the second reinforcement member 30 at a predetermined interval in the vehicle up-down direction.

In addition to the above, a pair of left and right second projecting portions 34 projecting toward the vehicle rear side from a corner portion of the member body 31 are formed on the second reinforcement member 30, each between the adjacent first projecting portions 33 in the vehicle up-down direction in a front view.

In other words, the second reinforcement member 30 is configured such that the first projecting portions 33 and the second projecting portions 34 project in a zigzag pattern along the vehicle up-down direction in a front view.

In the front body structure of the automobile 1 having the aforementioned configuration, although the first reinforcement member 20 is joined to a front surface of the cowl panel 10, it is possible to secure welding workability without impairing NVH performance of the vehicle.

Specifically, the cowl panel 10 includes the upper surface portion 104 to be joined to the front window glass 8, the forwardly bulging portion 105 extending from the upper surface portion 104, the rearwardly bulging portion 106 extending from the forwardly bulging portion 105, and the lower surface portion 107 extending from the rearwardly bulging portion 106, all of which are integrally formed. Therefore, the cowl panel 10 can be formed into such a shape that a sectional shape in a substantially vertical section along the vehicle front-rear direction becomes a substantially S-shaped section.

Further, the first reinforcement member 20 is formed into such a shape that the first reinforcement member 20 is bent along a front surface of the cowl panel 10 of a substantially S-shaped section. Therefore, a lower portion of the first reinforcement member 20 is located between a front surface of the forwardly bulging portion 105 and a front surface of the rearwardly bulging portion 106 in the vehicle front-rear direction in a state that the first reinforcement member 20 is joined to the cowl panel 10.

The front body structure of the automobile 1 having the aforementioned configuration is advantageous in securing a large space on the vehicle front side than the first reinforcement member 20. Therefore, it is easy to secure a space for inserting a welding gun when the cowl front panel 13 is spot-welded to the lower surface portion 107 of the cowl panel 10, for example.

Further, the member body 21 of the first reinforcement member 20 includes the wide portion 211 of a substantially squared U-shaped section extending in the vehicle width direction, and the narrow portion 212 configured such that a substantially squared U-shaped section extending from the wide portion 211 is narrowed in the vehicle width direction. This makes it possible to make a sectional area of the wide portion 211 in a substantially horizontal section substantially equal to a sectional area of the narrow portion 212 in a substantially horizontal section.

According to the aforementioned configuration, even if the first reinforcement member 20 has a shape such that the first reinforcement member 20 is bent along a front surface of the cowl panel 10 of a substantially S-shaped section, it is possible to make rigidity of an upper portion of the first reinforcement member 20 substantially equal to rigidity of a lower portion of the first reinforcement member 20.

Further, joining the first reinforcement member 20 to the cowl panel 10 makes it possible to make a sectional area of a closed section constituted by the wide portion 211 of the first reinforcement member 20, and the cowl panel 10 substantially equal to a sectional area of a closed section constituted by the narrow portion 212 of the first reinforcement member 20, and the cowl panel 10.

According to the aforementioned configuration, even if the first reinforcement member 20 has a shape such that the first reinforcement member 20 is bent along a front surface of the cowl panel 10 of a substantially S-shaped section, it is possible to improve rigidity of the cowl panel 10, and to improve supporting rigidity of the front window glass 8. Therefore, the front body structure of the automobile 1 is advantageous in suppressing vibration of the front window glass 8.

Further, the first reinforcement member 20 is bent along the cowl panel 10. Therefore, when a collision load is exerted on the front window glass 8 from above the vehicle, it is possible to promote deformation of the cowl panel 10 of a substantially S-shaped section by deformation of the first reinforcement member 20 at a bent portion. This makes it possible to absorb a collision load from above the vehicle.

Therefore, in the front body structure of the automobile 1, even in a case where the first reinforcement member 20 is joined to a front surface of the cowl panel 10, it is possible to secure welding workability without impairing NVH performance of the vehicle and protection performance of passers-by.

Further, disposing the first reinforcement member 20 in the vicinity of a substantially middle of the cowl panel 10 in the vehicle width direction allows for the front body structure of the automobile 1 to stably support the front window glass 8, and to suppress vibration of the front window glass 8.

Specifically, as compared with vicinities of both ends of the cowl panel 10 in the vehicle width direction for distributively supporting the weight of the front window glass 8 in cooperation with the front pillars 9, a vicinity of a substantially middle of the cowl panel 10 in the vehicle width direction is likely to be affected by the weight of the front glass window 8. In view of the above, a high supporting rigidity is required in a vicinity of a substantially middle of the cowl panel 10 in the vehicle width direction, as compared with vicinities of both ends of the cowl panel 10 in the vehicle width direction.

In view of the above, disposing the first reinforcement member 20 in the vicinity of a substantially middle of the cowl panel 10 in the vehicle width direction allows for the front body structure of the automobile 1 to improve supporting rigidity of the front glass window 8 in the vicinity of a substantially middle of the cowl panel 10.

The front body structure of the automobile 1 having the aforementioned configuration makes it possible to stably support the front window glass 8 in the entire area of the cowl panel 10 in the vehicle width direction.

Therefore, disposing the first reinforcement member 20 in the vicinity of the substantially middle of the cowl panel 10 in the vehicle width direction allows for the front body structure of the automobile 1 to suppress vibration of the front window glass 8.

Further, by forming the narrow portion 212 in an area from a bent portion of the first reinforcement member 20 along a bent portion of the rearwardly bulging portion 106 on the vehicle upper side to a lower end of the first reinforcement member 20, the front body structure of the automobile 1 is advantageous in securely suppressing vibration of the front window glass 8.

Specifically, the narrow portion 212 is formed in such a manner that a substantially squared U-shaped section extending from the wide portion 211 is narrowed in the vehicle width direction toward the vehicle lower side. Therefore, it is possible to extend the length of the narrow portion 212 in the vehicle front-rear direction as the narrow portion 212 extends toward the vehicle lower side.

Further, in the front body structure of the automobile 1, forming the narrow portion 212 from a bent portion of the first reinforcement member 20 along the rearwardly bulging portion 106 makes it possible to make a rear end of the narrow portion 212 close to the rearwardly bulging portion 106, and to weld the rear end of the narrow portion 212 to a front surface of the rearwardly bulging portion 106 without bending the bent portion of the first reinforcement member 20 along the rearwardly bulging portion 106 with a large curvature.

According to the aforementioned configuration, it is possible to avoid that a bent portion of the first reinforcement member 20 along the rearwardly bulging portion 106 is easily bent and deformed due to a load from above the vehicle. Therefore, the front body structure of the automobile 1 is advantageous in improving bending rigidity of the first reinforcement member 20, and in securely improving supporting rigidity of the front window glass 8.

Therefore, forming the narrow portion 212 from a bent portion of the first reinforcement member 20 along the rearwardly bulging portion 106 allows for the front body structure of the automobile 1 to securely suppress vibration of the front window glass 8.

Further, in the front body structure of the automobile 1, forming the cutaway portion 212a in the narrow portion 212 of the first reinforcement member 20 makes it easy to form the narrow portion 212 by the cutaway portion 212a when the first reinforcement member 20 is formed by three-dimensionally shaping a metal flat plate whose expanded shape is a substantially I-shape.

Further, in the front body structure of the automobile 1, the first reinforcement member 20 is formed by three-dimensionally shaping a metal flat plate whose expanded shape is a substantially I-shape. Therefore, it is possible to punch out multitudes of first reinforcement members 20 of an expanded shape efficiently from one metal flat plate. In other words, the front body structure of the automobile 1 is advantageous in easily forming the first reinforcement member 20 having a high yield and a high rigidity.

The term "squared U-shaped section" in the embodiment corresponds to "a substantially gate-shaped section" in the present invention.

The present invention is not limited to the configuration of the aforementioned embodiment. Many embodiments are applicable to the present invention.

For example, in the embodiment, the forwardly bulging portion 105 has a substantially gate-shaped section bulging toward the vehicle front side. The present invention, however, is not limited to the above. A substantially C-shaped section curved in such a manner as to project toward the vehicle front side may be used.

Further, the rearwardly bulging portion 106 has a substantially gate-shaped section bulging toward the vehicle rear side. The present invention, however, is not limited to the above. A substantially C-shaped section curved in such a manner as to project toward the vehicle rear side may be used.

The following is a summary of the present invention as described above.

The present invention is directed to an automobile front body structure provided with a cowl panel extending in a vehicle width direction of an automobile, and configured to support a lower portion of a front window glass from below a vehicle, and a reinforcement member joined to the cowl panel. The cowl panel includes: an upper surface portion to be joined to the front window glass; a forwardly bulging portion bulging toward a vehicle front side and a vehicle lower side from a front end of the upper surface portion; a rearwardly bulging portion bulging toward a vehicle rear side and the vehicle lower side from the forwardly bulging portion; and a lower surface portion extending toward the vehicle front side from the rearwardly bulging portion. The upper surface portion, the forwardly bulging portion, the rearwardly bulging portion, and the lower surface portion are integrally formed. The reinforcement member includes: a reinforcement member body having a substantially gate-shaped section opened toward the vehicle rear side, bent along a front surface of the cowl panel, and extending toward the vehicle lower side; a first joint portion extending outwardly in the vehicle width direction from an upper portion of the reinforcement member body, and joined to a front surface of the forwardly bulging portion of the cowl panel; and a second joint portion extending outwardly in the vehicle width direction from a lower portion of the reinforcement member body, and joined to a front surface of the rearwardly bulging portion of the cowl panel. The reinforcement member body, the first joint portion, and the second joint portion are integrally formed. The reinforcement member body includes: a wide portion whose sectional shape in a substantially horizontal section is a substantially gate-shaped section which is wide in the vehicle width direction, and extending toward the vehicle lower side along the forwardly bulging portion; and a narrow portion of a shape such that a substantially gate-shaped section extending from the wide portion is narrowed in the vehicle width direction as the narrow portion extends toward the vehicle lower side. A sectional depth of the narrow portion in a vehicle front-rear direction is larger than a sectional depth of the wide portion in the vehicle front-rear direction.

The substantially gate-shaped section may include a substantially squared U-shaped section opened toward a vehicle rear side, a substantially hat-shaped section opened toward a vehicle rear side, and a substantially U-shaped section opened toward a vehicle rear side. The reinforcement member body may be formed into such a shape that a wide portion and a narrow portion are integrally formed by three-dimensionally bending a flat plate whose expanded shape is a substantially rectangular shape in a plan view, for example.

According to the present invention, even in a case where the reinforcement member is joined to the front surface of the cowl panel, it is possible to secure welding workability without impairing NVH performance of the vehicle.

Specifically, the cowl panel is integrally formed by the upper surface portion to be joined to the front window glass, the forwardly bulging portion extending from the upper surface portion, the rearwardly bulging portion extending from the forwardly bulging portion, and the lower surface portion extending from the rearwardly bulging portion. Therefore, it is possible to form the cowl panel into such a shape that a sectional shape in a substantially vertical section along the vehicle front-rear direction is a substantially S-shaped section.

Further, the reinforcement member is formed into such a shape that the reinforcement member is bent along a front surface of the cowl panel of a substantially S-shaped section. Therefore, a lower portion of the reinforcement member is located between a front surface of the forwardly bulging portion and a front surface of the rearwardly bulging portion in the vehicle front-rear direction in a state that the reinforcement member is joined to the cowl panel.

According to the aforementioned configuration, the automobile front body structure is advantageous in securing a large space on the vehicle front side than the reinforcement member. Therefore, it is easy to secure a space for inserting a welding gun when a panel member is spot-welded to the lower surface portion of the cowl panel, for example.

Further, the reinforcement member body includes a wide portion of a substantially gate-shaped section extending in the vehicle width direction, and a narrow portion of a substantially gate-shaped section extending from the wide portion, which is narrowed in the vehicle width direction. Therefore, it is possible to make a sectional area of the wide portion in a substantially horizontal section substantially equal to a sectional area of the narrow portion in a substantially horizontal section.

According to the aforementioned configuration, even in a case where the reinforcement member has a shape such that the reinforcement member is bent along a front surface of the cowl panel of a substantially S-shaped section, it is possible to make rigidity of an upper portion of the reinforcement member substantially equal to rigidity of a lower portion of the reinforcement member.

Further, joining the reinforcement member to the cowl panel makes it possible to make a sectional area of a closed section constituted by the wide portion of the reinforcement member, and the cowl panel substantially equal to a sectional area of a closed section constituted by the narrow portion of the reinforcement member, and the cowl panel.

According to the aforementioned configuration, even in a case where the reinforcement member has a shape such that the reinforcement member is bent along a front surface of the cowl panel of a substantially S-shaped section, it is possible to improve rigidity of the cowl panel, and to improve supporting rigidity of the front window glass. Therefore, the automobile front body structure is advantageous in suppressing vibration of the front window glass.

Further, the reinforcement member is bent along the cowl panel. Therefore, when a collision load is exerted on the front window glass from above the vehicle, it is possible to promote deformation of the cowl panel of a substantially S-shaped section by deformation of the reinforcement member at a bent portion. This makes it possible to absorb a collision load from above the vehicle.

Therefore, in the automobile front body structure, even in a case where the reinforcement member is jointed to a front surface of the cowl panel, it is possible to secure welding workability without impairing NVH performance of the vehicle and protection performance of passers-by.

According to an aspect of the present invention, the reinforcement member may be disposed in a vicinity of a substantially middle of the cowl panel in the vehicle width direction.

A vicinity of a substantially middle of the cowl panel in the vehicle width direction is a substantially middle position in the vehicle width direction, or a position slightly offset from a substantially middle outwardly in the vehicle width direction.

The automobile front body structure having the aforementioned configuration is advantageous in stably supporting the front window glass, and in suppressing vibration of the front window glass.

Specifically, as compared with vicinities of both ends of the cowl panel in the vehicle width direction for distributively supporting the weight of the front window glass in cooperation with front pillars, a vicinity of a substantially middle of the cowl panel in the vehicle width direction is likely to be affected by the weight of the front glass window. In view of the above, a high supporting rigidity is required in a vicinity of a substantially middle of the cowl panel in the vehicle width direction, as compared with vicinities of both ends of the cowl panel in the vehicle width direction.

In view of the above, disposing the reinforcement member in the vicinity of the substantially middle of the cowl panel in the vehicle width direction allows for the automobile front body structure to improve supporting rigidity of the front glass window in the vicinity of the substantially middle of the cowl panel.

Thus, the automobile front body structure is advantageous in stably supporting the front window glass in the entire area of the cowl panel in the vehicle width direction.

Therefore, disposing the reinforcement member in the vicinity of the substantially middle of the cowl panel in the vehicle width direction allows for the automobile front body structure to suppress vibration of the front window glass.

Further, as an aspect of the present invention, the narrow portion of the reinforcement member may be formed in an area from a bent portion along the rearwardly bulging portion to a lower end of the reinforcement member.

The automobile front body structure having the aforementioned configuration is advantageous in securely suppressing vibration of the front window glass.

Specifically, the narrow portion is formed in such a manner that a substantially gate-shaped section extending from the wide portion is narrowed in the vehicle width direction toward the vehicle lower side. This makes it possible to increase the length of the narrow portion in the vehicle front-rear direction as the narrow portion extends toward the vehicle lower side.

Further, in the automobile front body structure having the aforementioned configuration, forming the narrow portion from the bent portion of the reinforcement member along the rearwardly bulging portion makes it possible to make a rear end of the narrow portion close to the rearwardly bulging portion, and to weld the rear end of the narrow portion to a front surface of the rearwardly bulging portion without bending the bent portion of the reinforcement member along the rearwardly bulging portion with a large curvature.

According to the aforementioned configuration, it is possible to avoid that the bent portion of the reinforcement member along the rearwardly bulging portion is easily bent and deformed against a load from above the vehicle. Therefore, the automobile front body structure is advantageous in improving bending rigidity of the reinforcement member, and in securely improving supporting rigidity of the front window glass.

Therefore, forming the narrow portion from the bent portion of the reinforcement member along the rearwardly bulging portion allows for the automobile front body structure to securely suppress vibration of the front window glass.

Further, as an aspect of the present invention, the narrow portion of the reinforcement member may include a cutaway portion formed by cutting a rear end edge of the narrow portion toward the vehicle front side in a side view.

In the automobile front body structure having the aforementioned configuration, it is easy to form the narrow portion by the cutaway portion when the reinforcement member is formed by three-dimensionally shaping a metal flat plate whose expanded shape is a substantially rectangular shape, for example.

The invention claimed is:

1. An automobile front body structure provided with a cowl panel extending in a vehicle width direction of an automobile, and configured to support a lower portion of a front window glass from below a vehicle, and a reinforcement member joined to the cowl panel, wherein
the cowl panel includes:
an upper surface portion to be joined to the front window glass;
a forwardly bulging portion bulging toward a vehicle front side and a vehicle lower side from a front end of the upper surface portion;
a rearwardly bulging portion bulging toward a vehicle rear side and the vehicle lower side from the forwardly bulging portion; and
a lower surface portion extending toward the vehicle front side from the rearwardly bulging portion,
the upper surface portion, the forwardly bulging portion, the rearwardly bulging portion, and the lower surface portion are integrally formed,
the reinforcement member includes:
a reinforcement member body having a substantially gate-shaped section opened toward the vehicle rear side, bent along a front surface of the cowl panel in a vehicle front-rear direction in a side view, and extending toward the vehicle lower side;
a first joint portion extending outwardly in the vehicle width direction from a rear end of an upper portion of the reinforcement member body in the vehicle front-rear direction along a front surface of the forwardly bulging portion in the vehicle front-rear direction, and joined to the front surface of the forwardly bulging portion; and
a second joint portion extending outwardly in the vehicle width direction from a rear end of a lower portion of the reinforcement member body in the vehicle front-rear direction along a front surface of the rearwardly bulging portion in the vehicle front-rear direction, and joined to the front surface of the rearwardly bulging portion,
the reinforcement member body, the first joint portion, and the second joint portion are integrally formed, and
the reinforcement member body includes:
a wide portion whose sectional shape in a substantially horizontal section is a substantially gate-shaped section which is wide in the vehicle width direction and opened toward the vehicle rear side, the wide portion extending toward the vehicle lower side along the front surface of the forwardly bulging portion; and
a narrow portion extending from the wide portion toward the vehicle lower side and having a shape such that a substantially gate-shaped section opened toward the vehicle rear side is narrowed in the vehicle width direction as the narrow portion extends toward the vehicle lower side, the narrow portion further having a smaller width than the wide portion, a sectional depth of the narrow portion in the vehicle front-rear direction being larger than a sectional depth of the wide portion in the vehicle front-rear direction.

2. The automobile front body structure according to claim 1, wherein
the reinforcement member is disposed in a vicinity of a substantially middle of the cowl panel in the vehicle width direction,
the first joint portion is provided on each of lateral sides of the reinforcement member body in the vehicle width direction, and
the second joint portion is provided on each of the lateral sides of the reinforcement body in the vehicle width direction.

3. The automobile front body structure according to claim 1, wherein
the narrow portion of the reinforcement member is formed in an area from a bent portion along the rearwardly bulging portion to a lower end of the reinforcement member.

4. The automobile front body structure according to claim 1, wherein
the narrow portion of the reinforcement member includes a cutaway portion formed by cutting a rear end edge of the narrow portion toward the vehicle front side in a side view.

5. The automobile front body structure according to claim 1, wherein
the reinforcement member is arranged at a position downwardly away from the upper surface portion of the cowl panel.

* * * * *